US00RE34554E

United States Patent [19]

Ausnit

[11] E Patent Number: Re. 34,554

[45] Reissued Date of Patent: Mar. 1, 1994

[54] BAGS WITH RECLOSABLE PLASTIC FASTENER HAVING AUTOMATIC SEALING GASKET MEANS

[75] Inventor: Steven Ausnit, New York, N.Y.

[73] Assignee: Minigrip, Inc., Orangeburg, N.Y.

[21] Appl. No.: 804,979

[22] Filed: Dec. 11, 1991

Related U.S. Patent Documents

Reissue of:

[64] Patent No.: 4,892,414
Issued: Jan. 9, 1990
Appl. No.: 308,932
Filed: Feb. 6, 1989

U.S. Applications:

[63] Continuation-in-part of Ser. No. 214,941, Jul. 5, 1988, abandoned.

[51] Int. Cl.[5] ..... B65D 33/16; B65D 33/24

[52] U.S. Cl. ..... 383/63; 383/5; 383/35; 383/65; 383/93; 383/97; 24/462; 24/587; 493/214; 493/927

[58] Field of Search ..... 383/5, 35, 39, 60, 63, 383/64, 65, 93, 95, 97; 493/214, 927; 156/66, 91; 24/387, 462, 587

[56] References Cited

U.S. PATENT DOCUMENTS

| | | | |
|---|---|---|---|
| 2,343,512 | 3/1944 | Lobl | 383/60 |
| 2,514,750 | 7/1950 | Dobbs et al. | 383/64 |
| 2,772,712 | 12/1956 | Post | 383/65 |
| 3,164,186 | 1/1965 | Weber et al. | 383/63 X |
| 3,346,883 | 10/1967 | Ersek | 4/1 |
| 3,700,019 | 10/1972 | Robbins et al. | 383/59 |
| 3,746,215 | 7/1973 | Ausnit et al. | 383/63 |
| 3,857,485 | 12/1974 | Frank | 383/63 X |
| 3,945,403 | 3/1976 | Noguchi | 383/63 |
| 3,991,801 | 11/1976 | Ausnit | 383/65 X |
| 4,235,653 | 11/1980 | Ausnit | 383/63 |
| 4,285,376 | 8/1981 | Ausnit | 383/63 X |
| 4,528,224 | 7/1985 | Ausnit | 383/63 |
| 4,589,145 | 5/1986 | VanErden et al. | 383/5 |
| 4,657,792 | 4/1987 | Ausnit | 383/63 X |
| 4,703,518 | 10/1987 | Ausnit | 383/63 |
| 4,733,778 | 3/1988 | Boeckmann et al. | 206/332 |
| 4,756,628 | 7/1988 | Branson | 383/87 X |
| 4,756,628 | 7/1988 | Branson | 383/63 |
| 4,787,754 | 11/1988 | Herrington | 383/63 |
| 4,787,755 | 11/1988 | Branson | 383/65 |
| 4,807,300 | 2/1989 | Ausnit et al. | 383/65 |
| 4,896,775 | 1/1990 | Boeckmann et al. | 383/64 X |
| 4,949,527 | 8/1990 | Boeckmann et al. | 383/63 X |

FOREIGN PATENT DOCUMENTS

| | | | |
|---|---|---|---|
| 90167 | 3/1961 | Denmark | 383/63 |
| 2818713 | 1/1979 | Fed. Rep. of Germany | 383/63 |
| 2332191 | 6/1977 | France | 383/63 |
| 62-25651 | 2/1987 | Japan . | |
| 62-109758 | 5/1987 | Japan . | |
| 98822 | 10/1961 | Norway | 383/63 |

*Primary Examiner*—Allan N. Shoop
*Assistant Examiner*—Jes F. Pascua
*Attorney, Agent, or Firm*—Hill, Steadman & Simpson

[57] ABSTRACT

A bag with an openable mouth carries a reclosable extruded plastic zipper inside the mouth. The zipper has complementary profiles separably interlockable in a closed condition of the zipper. A gasket flange structure in separably sealingly grippingly interengageable by and between the profiles in the closed condition of the zipper, and may also serve as a tamper evident or tamper discouraging device.

42 Claims, 3 Drawing Sheets

BAGS WITH RECLOSABLE PLASTIC FASTENER HAVING AUTOMATIC SEALING GASKET MEANS

Matter enclosed in heavy brackets [ ] appears in the original patent but forms no part of this reissue specification; matter printed in italics indicates the additions made by reissue.

This is a *reissue of U.S. Pat. No. 4,892,414, issued Jan. 9, 1990, application Ser. No. 308,932, filed Feb. 6, 1989, which is a* continuation-in-part of application Ser. No. 214,941, filed July 5, 1988, now abandoned.

BACKGROUND OF THE INVENTION

The present invention relates to bags or packages such as may be formed from plastic film and have an openable mouth and carry a reclosable extruded plastic fastener or zipper inside the mouth. The zipper has complementary profiles separably interlockable in a closed condition of the zipper. Bags or packages of this kind are well known and in widespread use.

In the extrusion of the zipper profiles, especially of the single complementary rib and groove type, due to necessary tolerances it is not feasible to secure a tightly sealing interengagement of the complementary interlock surfaces of the profiles. For many uses, such tolerances are acceptable. However, for some purposes, a thoroughly sealed interlocked relationship of the profiles is desirable.

Heretofore, it has been proposed to attain a sealed condition by applying the zipper strips to the outside of the bag walls and gripping the bag walls within the interlocked zipper strips. Examples of such constructions are found in Danish Pat. No. 90167 of 1961, Norweigan Pat. No. 98822 of 1961, U.S. Pat. No. 3,346,883 and recently issued U.S. Pat. No. 4,703,518. A problem with that construction is that in this fashion it will act to separate the profiles when pressure is transferred onto them by the spreading out of the contents within the bags. Also in many instances the bag sheet material or film will be too thick to be readily gripped within the customary size zipper profiles for bags or package of particular dimensions. An undesirably larger profile structure may be needed to accommodate the bag wall thicknesses, in the grip of the two zipper profiles as is necessary with such a zipper closure scheme. Alternately if the customary size is retained, the bag material may be too thick.

U.S. Pat. No. 2,772,712 is noted as showing narrow zipper profile opening strip clamped between the profiles, but that strip has no sealing function and may actually have the reverse effect i.e. promote leakage by holding the profiles spaced apart adjacent to the narrow strip.

SUMMARY OF THE PRESENT INVENTION

An important object of the present invention is to provide a new and improved zipper sealing arrangement which is especially suitable for effecting tight sealing of extruded plastic profile zippers for location at the inside of the mouth ends of bags or packages, without affecting the holding ability of the profiles against unintentional opening.

Another object of the invention is to provide a new and improved method of and means or tight sealing extruded plastic zippers for bags or packages, by incorporating a gasket film sealer into the upper or outer flange of the zipper and/or into the lower or inner flange of the zipper and independently of the bag wall.

A further object is to provide a new and improved sealing structure as indicated which will also serve as a tamper evident or discouraging device.

In accordance with the principles of the present invention, there is provided a bag or package having an openable mouth carrying a reclosable extruded plastic zipper inside the mouth, the zipper having complementary profiles separably interlockable in a closed condition of the zipper, and gasket flange means for separably sealingly gripping interengagement by and between the profiles in the closed condition of the zipper.

There is also provided a method of making a bag or package of this kind.

IN THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

Figure 13:
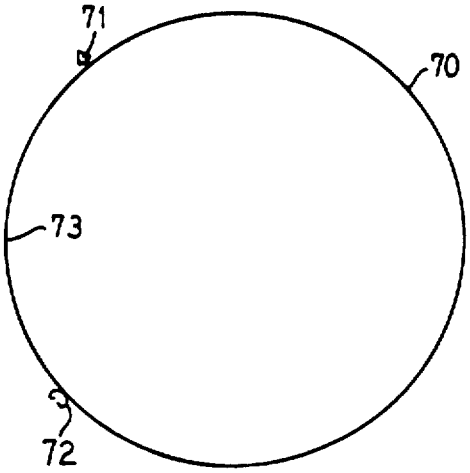
FIG. 13 is an end elevational view of a tubular bag making material extrusion especially useful for practicing the present invention.
Figure 14:
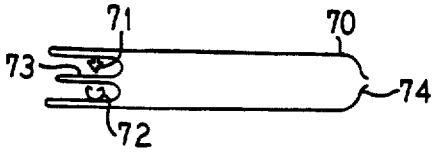
Figure 15:
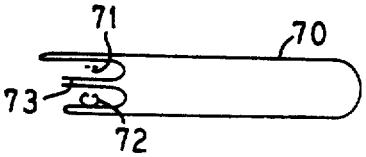
Figure 16:
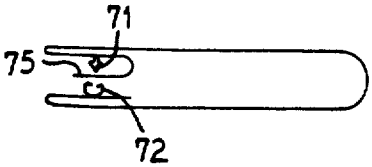

FIGS. 14, 15 and 16 demonstrate various ways in which the extrusion of FIG. 13 may be formed into a bag shape;

FIGS. 17 through 22 show additional embodiments of the present invention.

DETAILED DESCRIPTION

Figure 1:
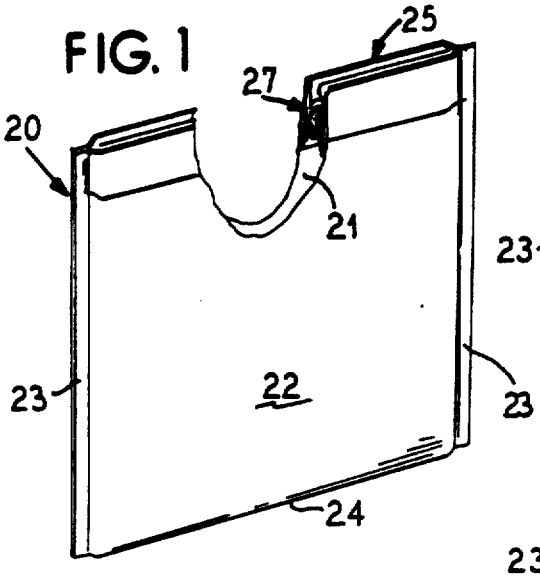
FIG. 1 is a perspective view of a bag, partially broken away for revealing details of structure, and embodying the present inventing.
Figure 2:
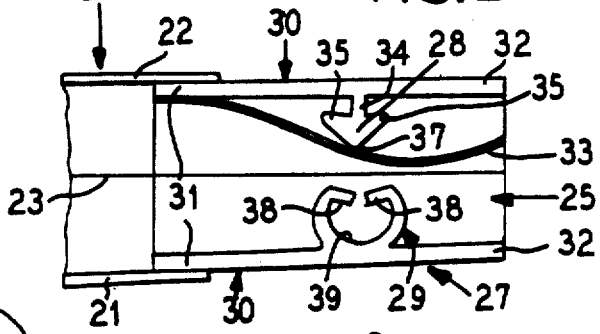
FIG. 2 is an enlarged schematic illustration of the mouth end of the bag of FIG. 1 showing the zipper open.
Figure 3:
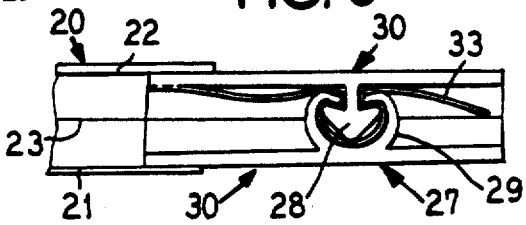
FIG. 3 is a similar view showing the zipper closed.

Referring to FIGS. 1, 2 and 3, a bag 20 may be made from any suitable sheet material or plastic film and comprises opposite wall panels 21 and 22, which may be secured together at opposite side edges of the bag by seams 23. At a bottom edge 24 the wall panels 21 and 22 are attached as by means of folding the sheet material or sealing the sheet material panels.

At its top end, the bag 20 has an openable mouth 25 on the inside of which is an extruded plastic fastener or zipper assembly 27.

In one desirable form, the zipper assembly 27 is an extruded plastic structure which comprises a generally arrowshape rib male profile 28 and a complementary generally groove shaped female profile 29. Each of the profiles is of strip form with a base web 30. By preference, each web 30 is of resiliently flexible self sustaining form and may be thicker than the wall panels 21 and 22. Also, each of the web 30 may have an inwardly directed (having regard to the inside of the bag) web flange section 31 or portion which may be secured as by means of heat sealing or adhesive to the associated bag wall panel. Thereby, the zipper webs 30 form part of the mouth 25 of the bag. To facilitate opening manipulation of the zipper 27, the webs 30 may be provided with outwardly extending section or portions 32.

According to the present invention, a new and improved sealing gasket means in the form of a thin tongue flange 33 is provided for separably sealingly gripping interengagement by and between the profiles 28 and 29 in the closed condition of the zipper. The gasket flange 33 may be in the form of a thin strip of extruded, cast or scived plastic substantially thinner than the zipper webs 30 and may also be substantially thinner than the material of the wall panels 21 and 22. For example, the gasket flange 33 may be of about 1-mil thickness as compared to a 3-mil or greater thickness of the zipper webs 30 and a 1½ mil or greater thickness of the wall panels 21 and 22. Of course, these relative proportions may be varied suitably for different dimensions of bags and zipper profiles to meet particular situations. The principal aim is to assure that when the zipper 27 is closed, a thoroughly fluid tight relationship is attained throughout the length of the zipper with which the gasket flange 33 should be coextensive.

While the gasket flange 33 may be extruded integrally with one of the zipper webs 30, it may also, as shown, be separately formed and assembled with the inner face of the associated web 30 and permanently attached by means of heat sealing or adhesive along one margin to a margin of the web. As shown in FIGS. 1-3, the gasket flange 33 is secured along its inner margin to the margin of the web section 31 of the web 30 of the profile 28. If preferred, of course, the gasket flange 33 may be secured to the inner section 31 of the web 30 of the profile 29. If preferred, of course, flange 33 is preferably of a width about the same as the width of the zipper 27 and of the same length so that the opposite ends of the gasket flange 33 are secured, together with the opposite ends of the zipper profile strips in the side seams 23 of the bag 20. Through this arrangement, the gasket flange 33 extends between and across the profiles 28 and 29 and permits free access by way of the mouth 25 to the interior of the bag when the zipper is open as shown in FIG. 2.

In the closed condition of the zipper 27, as shown in FIGS. 1 and 3, the gasket flange 33 is tightly sealingly gripped by and between the profiles 28 and 29. In this sealing, gripped interengagement, the gasket flange 33 provides at least a two-point seal along the length of the zipper. It will be noted that the arrowshaped rib profile 28 has a stem 34 flanked by shoulders 35 of the main rib portion of the profile, and a tip 37 of the profile 28 extends in the opposite direction from the shoulders 35. When the profile 28 is pushed into interlocking engagement with the profile 29, gripper jaws 38 are cammed resiliently apart until they pass by and snap into interlocking relation to the shoulders 35 with the arrowhead of the profile 28 received in a groove 39 in the profile 29. As the profiles 28 and 29 are pushed into the interlocking relation, the intervening gasket flange 33 is drawn into the sealing interengagement wherein the jaws 38 sealingly thrust the gasket flange against the shoulders 35 and the tip 37 sealingly presses the gasket flange against the base or root of the groove 39. Even though one of the jaws 38 may not grip the confronting shoulder 35 as thoroughly sealingly as might be desired, the other of the jaws 38 may be depended upon to effect a thorough sealing engagement with its confronting shoulder 35. The reaction of either one or both of the jaws 38 against the respective shoulders 35 causes the tip 37 so thrust sealingly toward the area of the gasket flange gripped by the tip and force it sealingly against the root of the groove 39. A dependable fluid tight seal is thus attained by the simple expedient of separably sealingly gripping the gasket flange 33 by an between the profiles 28 and 29.

Another advantage of the gasket flange sealing arrangement is that the desirable attributes of greater resistance to opening of the zipper against pressures from inside the bag is not interfered with, nor is easy opening of the bag by manipulation of the pull flanges 32 interfered with. It will be understood that the profile structure is desirably equipped for differential harder opening from the inside of the bag and relatively easier opening from outside of the bag by manipulation of the pull flanges. As the gasket flange 33 is drawn into interengagement with the closed zipper profiles, the flexibility and a certain degree of stretchability of the thin gasket flange material facilitates the interengagement without significant resistance.

Figure 4:
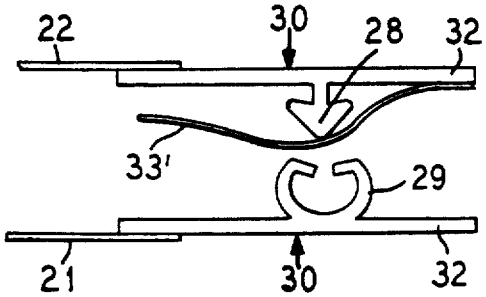
FIGS. 4, 5 and 6 are schematic illustrations similar to FIG. 2, and showing various modifications.

In FIG. 4, the construction is essentially the same as in FIGS. 1-3, except that the gasket flange 33' is attached at its outer or upper margin to the pull flange 32 of the zipper strip of the profile 28.

Figure 5:
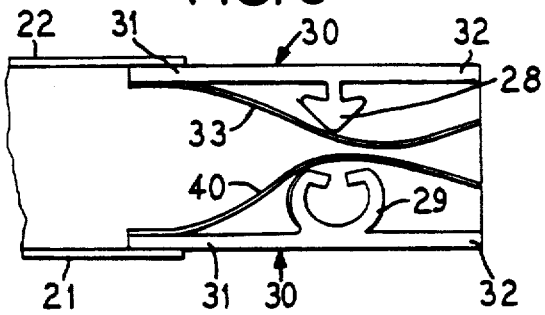

FIG. 5 shows a construction which is essential respect is similar to FIGS. 1-3 except that in addition to the gasket flange 33, attached to the base web of one of the zipper strips, a second similar gasket flange 40 is similarly attached to the other of the zipper strips. This affords a substantially increased separably sealing gripping interengagement of gasket flange means by and between the profiles 28 and 29, while maintaining the flexibility and stretchability of the thinnest practicable thickness or gauge of the gasket flanges. The individual flexibility and stretchability of the gasket flanges 33 and 40 facilitates the drawing of the double gasket flanges into the interengaged relation by an between the zipper profiles.

Figure 6:
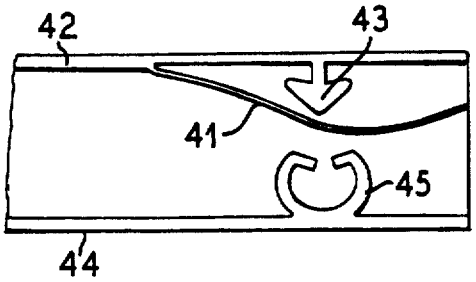

Instead of a multipart construction, FIG. 6 discloses a construction wherein a gasket flange 41 is formed as an integral extrusion with a bag wall panel 42 carrying a generally arrowshape rib profile 43 while the opposite wall panel 44 carries a complementary generally groove shaped jaw profile 45. Functionally, the relationship of the gasket flange 41 is the same with respect to the profiles 43 and 45 as gasket flange 33 in FIGS. 1-3 relates to the profiles 28 and 29.

Figure 7:
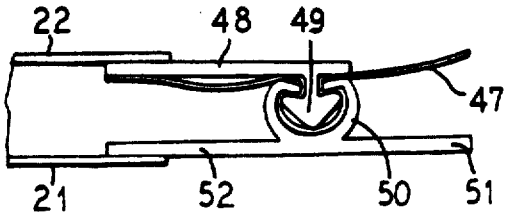
FIGS. 7 and 8 are views similar to FIG. 3, and showing other modifications.

If desired, a gasket flange 47 (FIG. 7) carried by a zipper strip base web 48, in much the same manner as described in connection with the gasket flanges 33 in FIGS. 1-3, may serve as one of the pull flanges of the bag with which associated. To this end, the zipper base web 48 does not have a pull flange portion so that after profile 49 is interlocked with profile 50, a free marginal portion of the gasket flange 47 will project substantially beyond the outer or top end of the base web 48 and serve as a pull flange in cooperation with a pull flange portion 51 on the zipper strip web 52 which carries the profile 50.

Figure 8:
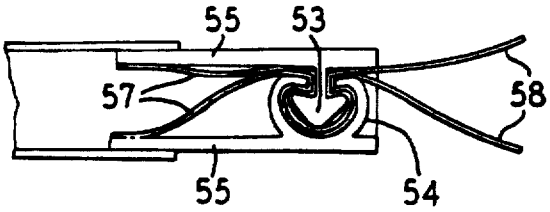
Figure 9:
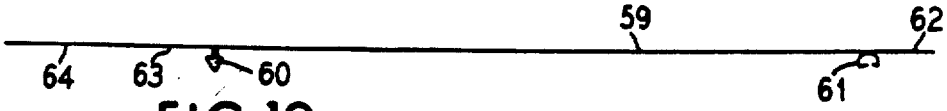
FIG. 9 is an edge elevational view of a one-piece extruded film and zipper construction especially useful for making bags according to the present invention.
Figure 10:
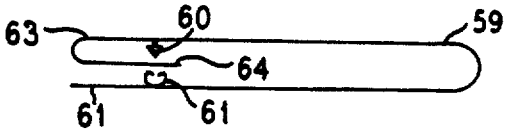
FIG. 10 is a view showing the bag making material of FIG. 9 formed into a bag shape.
Figure 11:
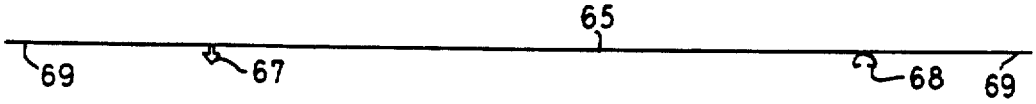
FIG. 11 is a view similar to FIG. 9, but showing a modification.
Figure 12:
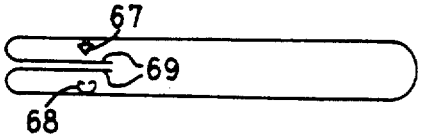
FIG. 12 is a view similar to FIG. 10 and showing the material of FIG. 11 formed into a bag shape.

In FIG. 8, an arrangement is depicted wherein zipper profiles 53 and 54 are carried by respective base webs 55 which do not have pull flanges. In this arrangement, similar gasket flanges 57 respectively carried by the zipper strip base webs 55 are of a width to project substantially outwardly or upwardly beyond the closed zipper to provide pull flanges 58. By pulling the pull flanges 58 apart by manual force, the zipper profiles 53 and 54 will be pulled apart and the zipper opened.

Where the bag making sheet material is at least in a single thickness suitable for gasket flange means purposes, the arrangement disclosed in FIGS. 9 and 10 may be employed. Therein, a sheet of bag making material 59 may carry complementary profiles 60 and 61 in suitably spaced relation to bring the profiles into cooperating reclosable zipper relation with a pull flange extension 62 extending from the base of the zipper profile 61 and a pull flange extension 63 extending from the base of the zipper profile 60. In this instance, the pull flange 63 is extended to provide a gasket flange 64 which is doubled back between the profiles 60 and 61 and functions similarly as the gasket flange 33 in FIG. 4.

Where bag making sheet material 65 is thin enough (FIG. 11), and zipper profiles 67 and 68 carried by the sheet material are large enough to accommodate double plies of the sheet material in a gasket flange relation, both pull flange ares of the sheet 65 may be extended to provide gasket flanges 69 and return bent similarly as the gasket flange area 64, in FIG. 10, is return bent so that both of the areas 69 will be separably sealingly grippingly interengaged by and between the profiles 67 and 68 in the closed condition of the zipper.

FIGS. 13–16 depict how bag formations may be formed up from a tubular bag making plastic material extrusion 70 and the resulting bags equipped with gasket flanges formed from the material of the tubular extrusion. To this end, the tubular extrusion carries on its outer perimeter integral complementary zipper profiles 71 and 72 which, when the tubular extrusion is collapsed, are brought into cooperative interengageable relation.

As shown in FIG. 14, an area 73 of the tubular extrusion 70 between the profiles 71 and 72 is folded to extend as a double gasket flange 73 between the profiles 71 and 72. When the profiles 71 and 72 are compressed into closed zipper relation, the gasket flange fold 73 is separably sealingly grippingly interengaged by and between the profiles. This bag formation is adapted to be filled by splitting it open along the bottom of the formation as indicated at 74. The split is then sealed after the bag has been filled and the bag remains thoroughly sealed hermetically until it is desired to dispense contents through the mouth end of the bag, whereupon the folded gasket flange 73 will serve as tamper evident or tamper discouragement means, but may be split to provide an opening into the bag when legitimate access into the bag is desired. Contents remaining within the bag after the bag has been opened as described may be sealed by sealingly engaging the split gasket flange 73 by and between the zipper profile 71 and 72.

If preferred, the double gasket 73 arrangement can be provided split as shown in FIG. 15, to facilitate filling the bag through its mouth end.

Where only a single gasket flange 75 is desired as shown in FIG. 16, the area of the extrusion between the profiles 71 and 72 may be narrower or partially trimmed away. Only the single gasket flange 75 is permitted to remain adjacent to the profile 71. The corresponding area adjacent to the profile 72 is foreshortened or trimmed away.

In all of the bag forms of FIGS. 14, 15 and 16, derived from the tubular extrusion 70, portions of the tube alongside the profiles 71 and 72 are desirably shaped into folds providing pull flanges, substantially as shown. Thereby the pull flanges are each of double the thickness of the tubular extrusion and the cooperating portions of each fold mutually reinforce one another.

Also, in all of the integrally extruded bag forms shows in FIGS. 9–16, the gasket strip is always an extension of the zipper flange and never a part of the lower bag wall material. Hence, separation forces on the inside of the bag acting on the bag wall never have a separating effect on the strip.

It will be understood that variations and modifications may be effected without departing from the spirit and scope of the novel concepts of the present invention.

Figure 17:
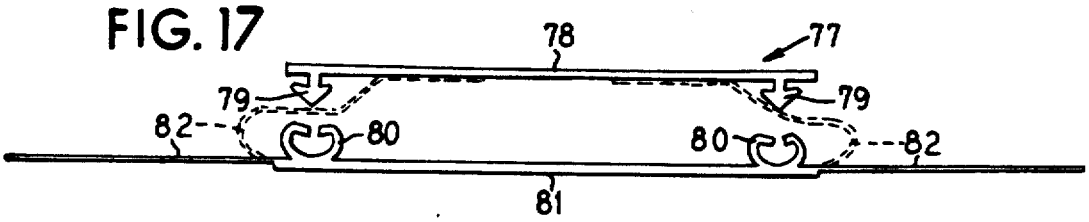

FIG. 17 depicts an extruded plastic zipper assembly 77 comprising a zipper web 78 having adjacent to opposite edges profile ribs 79 of generally arrow shape construction and which are reclosably interlockable with complementary shouldered groove shaped profiles 80 on a zipper web 81. One of the webs 78 and 81, and in this instance the web 81, has integrally extruded therewith, and to extend from the opposite side edges, respective preferably equal width substantially thinner gasket flanges 82. These gasket flanges 82 are of sufficient width to be turned to extend between the separated profiles 79 and 80 and to be permanently secured in fluid tight manner to the inner surface of the web 78 spaced from the profiles 79. Thereby, when the zipper profiles 79 and 80 are pressed into interlocked relation, the interposed gasket flanges 82 will be interlocked with the zipper profiles and effect a through seal in the same manner as explained in connection with the gasket flanges of the already described forms of the invention. It will be understood that the zipper webs 78 and 81 as well as the profiles 79 and 80 are respectively of indeterminate length and/or size. Either before or after the profiles of the two webs are interlocked, and preferably after they are interlocked, the dual zipper structure is adapted to be separated by longitudinally severing the same into two zipper strips similarly as indicated at S in FIG. 18 which shows a slightly different embodiment. The zipper strips are then available for attachment to bag or package film material, similarly as described in connection with the top opening bag 20 in FIG. 2, for example. On the other hand, the two halves of the severed zipper assembly 77 may be utilized for packages of the kind disclosed in U.S. Pat. No. 4,589,145.

Figure 18:
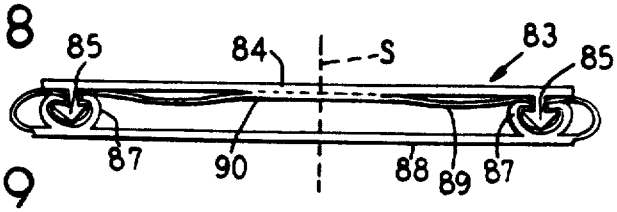

FIG. 18 discloses a zipper structure assembly 83 similar to the assembly 77 in FIG. 17. In the assembly 83 a web 84 has adjacent to its opposite edges generally arrow shaped rib zipper profiles 85 which are reclosably interlockable with complementary groove shaped profiles 87 on an opposite zipper web 88. One of the webs 84 and 88, and in this instance the web 88, has integrally extruded therewith and extending from each opposite edge a continuous film gasket flange 89 which overlies the profiles 87 and is permanently secured at preferably its central area 90 to the inner surface of the zipper web 85. Thereby, when the profiles 85 and 87 are pressed into interlocked relation as shown, the gasket flange 89 is sealingly gripped by and between the profiles. The assembly 83 may then be divided into two zipper strips along the median line S.

Figure 19:
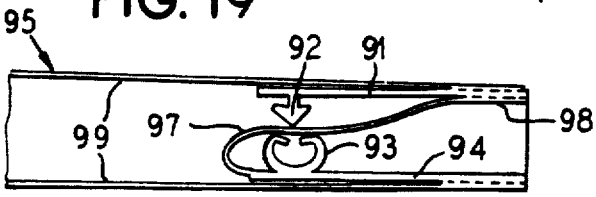
Figure 20:
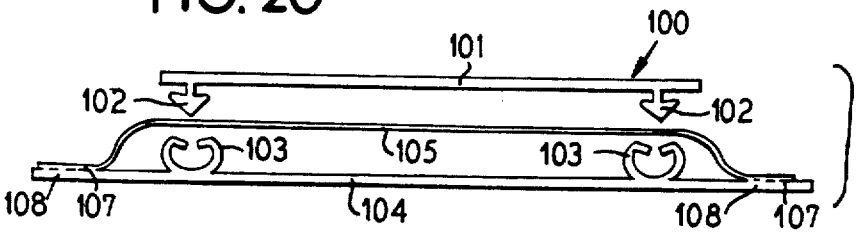

In the arrangement shows in FIG. 19, a zipper assembly, which may comprise one half of an extrusion similar to the extruded assemblies of FIGS. 17 and 18, has a zipper web 91 provided with a rib profile 92 interlockably engageable with a complementary groove shaped profile 93 on a similar zipper web 94. One of the webs 91 and 94, and in this instance the web 94, has extending from its edge which is disposed to be at the inner side of a bag or package 95 an integrally extruded gasket flange 97 which is turned outwardly over the profile 93 and extends between the profiles 92 and 93 and is permanently thoroughly sealed as shown at 98 to the zipper web 91 along its edge remote from the profile 92. The portions of the webs 91 and 94 which are to extend outwardly relative to the bag 95 are of substantial width and have their outer margins permanently secured in hermetically sealed relation to portions of bag or package wall film panels 99. The gasket flange 97 thereby provides a frangible hermetic seal for the mouth of the bag or package. In this instance it will also be noted that at least one of the webs 91 and 94 inwardly from attachment to the wall panels 99 is free from the wall panels so as to provide for hinging of said wall panel or panels 99 away from the zipper when the walls are puffed out from contents or gas pressures internally of the bag or package, so that when interlocked, the zipper profiles 92 and 93 will not tend to separate due to the internal pressures.

Figure 21:
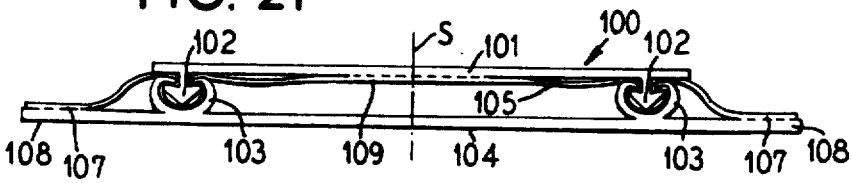

A zipper assembly 100 (FIG. 20 and 21) which is similar to the zipper assemblies 77 and 83 of respectively FIGS. 17 and 18, comprises a zipper web 101 having adjacent to its opposite edges respective arrow shape cross section zipper profiles 102 adapted to be reclosably interlockable with complementary groove shaped extruded zipper profiles 103 on a zipper web 104 opposite the web 101. In this instance a continuous gasket flange 105 is secured at its opposite margins permanently sealingly fixedly as shown at 107 to lateral flange extensions 108 of the zipper web 104. In the assembly, the gasket flange 105 overlies the profiles 103 and intervenes between the profiles 102 and 103 so that, as shown in FIG. 21, the gasket flange 105 is adapted to be sealingly gripped by and between the profiles 102 and 103. Completion of the zipper assembly 101 may be effected by the permanently sealing an intermediate portion 109 of the gasket flange 105 onto the inner surface of the zipper web 101 for use as a reclosable zipper at a bag or package mouth, in similar manner as in FIG. 7, for example. The dual zipper profile assembly 100 is adapted to be separated medially along a line S similarly as described in connection with FIG. 18 is provide two similar zipper strips, if desired.

Figure 22:
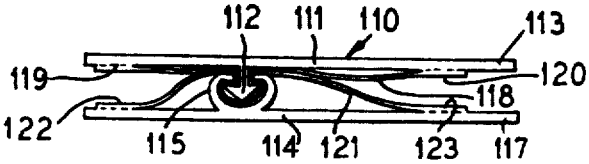

In FIG. 22 is shown a zipper assembly arrangement 110 similar to FIG. 8, but with both edges of the gasket flanges secured to their respective zipper webs. Accordingly, a zipper web 111 having an integrally extruded zipper rib profile 112, and one portion 113 of the web 111 wider than the other, opposes a zipper web 114 carrying an integrally extruded groove shaped complementary zipper profile 115 and one portion 117 of the profile 114 wider than the other portion similarly as described in connection with and complementary to the zipper web 111. A gasket flange 118 is of a width to extend along the inner face of the zipper web 111 across the profile 112 and has a margin permanently secured in sealing relation at 119 at one side of the profile 112 and the opposite marginal portion 120 permanently sealingly secured to the web 111 at the opposite side of the profile 112. Similarly, a gasket flange 121 is of a width to extend past the profile 115 and with one edge portion 122 permanently sealingly secured to the inner face of the zipper web 114 and the opposite edge portion 123 secured in permanent sealing relation to the web 114 at the opposite side of the profile 115. Through this arrangement, the gasket flanges 118 and 121 are sealingly gripped by and between the profiles 112 and 115 when the profiles are pressed into reclosable relation as shown.

It may be observed that because the gasket flanges in FIGS. 17, 18, 19 and 20, 21 are permanently sealed to both of the zipper webs, they serve not only as hermetic seals between the zipper webs, but also serve not only as tamper evident or tamper discouraging means for the bag or package to which any of these zipper assemblies may be secured. In order to gain access into the associated bag it is necessary to rupture the gasket flange. Therefore, if any gasket flange is ruptured unauthorized, it will be clearly evident that the bag or package has been tampered with.

A further advantage of the embodiments of the invention disclosed in FIGS. 17, 18, 20 and 21 is that they may be utilized in a package arrangement of the general type disclosed in U.S. Pat. No. 4,733,778 wherein the zipper assemblies are not medially longitudinally severed, but may serve as reusable carrier tapes, and with the benefit of thorough sealing of the interlocked zippers by virtue of the gasket flange structures, and the tamper evident or tamper discouraging facility of the unruptured gasket flanges.

What is claimed is:

[1. A bag or package having an openable mouth carrying an elongate reclosable extruded plastic zipper extending across the inside of said mouth.

said zipper having complementary profiles separably interlockable in a closed condition of the zipper; and gasket flange means extending along substantially the full length of the profiles for separably sealingly gripping interengagement by and between said profiles in said closed condition of the zipper.]

2. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attaching at least one side of the gasket flange so that it is positioned within the bag mouth so that the gasket flange means does not apply an opening force to the zipper due to internal forces on the wall panels; and* wherein said zipper profiles have base webs secured to respective walls of said bag or package, and said gasket flange [means] is attached to one of said base webs.

3. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping*

*interengagement by and between said profiles in said closed condition of the zipper;*

*and means attaching at least one side of the gasket flange means so that it is positioned within the bag mouth so that the gasket flange means does not apply an opening force to the zipper due to internal forces on the wall panels; and* wherein said zipper profiles have respective base webs attached to wall panels of the bag or package, and said gasket flange [means] comprises a pair of gasket flanges, one of which is attached to one of said base webs and the other of which is attached to the other of said base webs.

[4. A bag or package according to claim 1, wherein said bag or package has opposite wall panels, and said gasket flange means is attached to the inside of one of said wall panels.]

5. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attaching at least one side of the gasket flange means so that it is positioned within the bag mouth so that the gasket flange means does not apply an opening force to the zipper due to internal forces on the wall panels; and* wherein said bag or package has extruded plastic wall panels, said profiles are extruded integrally with said wall panels, and said gasket flange [means] is attached to one of said wall panels.

6. A bag or package according to claim 5, wherein said gasket flange [means] is extruded integrally with one of said wall panels.

7. A bag or package [to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attached at least one side of the gasket flange means so that it is positioned within the bag mouth so that the gasket flange means does not apply an opening force to the zipper due to internal forces on the wall panels; and* wherein said bag or package has extruded plastic wall panels, opening flanges being extruded integrally with said wall panels, and said gasket flange [means] being attached to one of said opening flanges.

8. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attaching at least one side of the gasket flange means so that it is positioned within the bag mouth so that the gasket flange means does not apply an opening force to the zipper due to internal forces on the wall panels; and* wherein said bag or package has extruded plastic wall panels; opening flanges being extruded integrally with said wall panels, said profiles being extruded integrally with said opening flanges, and said gasket flange [means] being attached to one of said opening flanges.

9. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attaching at least one side of the gasket flange so that it is positioned within the bag mouth so that the gasket flange means does not apply an opening force to the zipper due to internal forces on the wall panels; and* wherein said gasket flange [means] comprises a pull flange on said bag or package.

10. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper*

*and means attaching at least one side of the gasket flange so that it is positioned within the bag mouth so that the gasket flange means does not apply an opening force to the zipper due to internal forces on the wall panels; and* wherein said gasket flange [means] comprises a pair of gasket flanges, and said pair of gasket flanges serve as pull flanges for opening the zipper by manual force.

11. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attaching at least one side of the gasket flange so that it is positioned within the bag mouth so that the gasket flange means does not apply an opening force to the zipper due to internal forces on the wall panels; and* wherein said gasket flange [means] comprises extension of pull flange means on said bag.

12. A bag or package [according to claim 1,] *formed by wall panels having an openable mouth carrying an elongate reclosable extruded plastic zipper extending across the inside of said mouth*

*said zipper having complementary profiles separably interlockable in a closed condition of the zipper;*

*gasket flange extending along substantially the full length of the profiles for separably sealingly gripping interengagement by and between said profiles in said closed condition of the zipper;*

*and means attaching at least one side of the gasket flange means so that it is positioned within the bag mouth so that the gasket flange means does not apply an opening force to the zipper due to internal forces on the wall panels; and* wherein said bag or package comprises a thin plastic film carrying said zipper profiles, and an area of said [bag material] *wall panels* comprises said gasket flange [means].

13. A bag or package according to claim 12, wherein said bag or package, material comprises folded pull flanges adjacent to said profiles, and said gasket flange [means] comprises part of at least one of said folded pull flanges.

14. A method of making a bag or package *formed by wall panels* having an openable mouth *and* carrying an elongated reclosable extruded plastic zipper extending across the inside of said mouth, comprising:

providing said zipper with complementary profiles separably interlockable in a closed condition of the zipper; [and]

providing gasket flange [means] extending throughout the length of said zipper for separably sealingly gripping interengagement by and between said profiles in said closed condition of the zipper *and attaching at least one side of the gasket flange fixing its position within the bag mouth so that the gasket flange does not apply an opening force to the zipper due to internal forces on the wall panels.*

15. A method according to claim 14, which comprises providing said zipper profiles with base webs and securing said webs to respective walls of said bag or package, and attaching said gasket flange [means] to one of said base webs.

16. A method according to claim 14, which comprises providing said zipper profiles with respective base webs, attaching said base webs to wall panels of the bag or package, providing said gasket flange [means] as a pair of gasket flanges, attaching one of said gasket flanges to one of said base webs, and attaching the other of said gasket flanges to the other of said base webs.

17. A method according to claim 14, which comprises providing said bag or package with opposite wall panels and attaching said gasket flange [means] to one of said wall panels.

18. A method according to claim 14, which comprises providing said bag or package with extruded plastic wall panels, extruding said profiles integrally with said wall panels, and providing said gasket flange [means] attached to one of said wall panels.

19. A method according to claim 18, which comprises extruding said gasket flange [means] integrally with one of said wall panels.

20. A method according to claim 18, which comprises extruding said plastic wall panels in tubular form, extruding said profiles integrally with said wall panels, and extruding an area between said profiles to provide pull flange [means] and gasket flange means integrally attached thereto.

21. A method according to claim 14, which comprises forming said flange [means] as a pull flange on said bag or package.

22. A method according to claim 14, which comprises forming said gasket flange [means] in the form of a pair of gasket flanges in the form of pull flanges for opening the zipper by manual force.

23. A method according to claim 14, comprising forming said gasket flange [means] as an extension of pull flange means on said bag or package.

24. A method according to claim 14, which comprises forming said bag or package from a thin plastic film carrying said zipper profiles, and forming an area of said film into said gasket flange [means].

25. A method according to claim 24, which comprises folding said film into pull flange adjacent so said profiles, and forming said gasket flange [means] as part of at least one of the folded pull flanges.

26. A method according to claim 14, which comprises providing one of said profiles in generally arrowshape and providing the other of the profiles of generally groove shape complementary to the arrowshape profile, and providing said profiles with at least a pair of cooperating surfaces for gripping said gasket flange [means] sealingly therebetween.

27. A method according to claim 26, which comprises providing said arrowshape profile with a pair of shoulders, and providing said groove shaped profile with a pair of jaws engageable with said shoulders, said jaws and shoulders being sealingly engageable with said gasket flange [means].

28. A method according to claim 26, which comprises providing said arrowshape profile with a tip located for thrusting an intervening portion of said gasket flange [means] against a root surface of said groove shaped profile.

29. A method according to claim 14, which comprises providing said profiles with a three-point sealing interengagement of said gasket flange [means].

30. In a bag or package having an openable mouth carrying an elongate reclosable extruded plastic zipper inside said mouth;

said zipper comprising a generally arrowshape profile and a generally groove shaped complementary profile and said profiles being interlockable in a closed condition of the zipper; and gasket flange means extending throughout the length of said zipper for separably sealingly gripping interengagement by and between said profiles in said closed condition of the zipper, and said profiles having at least a pair of cooperating surfaces which grip said gasket flange [means] sealingly therebetween.

31. A bag or package according to claim 30, wherein said arrowshape profile has a pair of shoulders, and said groove shaped profile has a pair of jaws engageable with said shoulders and said jaws and shoulders being sealingly engageable with said gasket flange [means].

32. A bag according to claim 30, wherein said arrowshape profile has a tip which thrusts an intervening portion of said gasket flange [means] against a root surface of said groove shaped profile.

33. A bag according to claim 30, wherein said profiles provide a three-point sealing interengagement of said gasket flange [means].

34. A bag or package according to claim 2, said zipper comprising opposed webs carrying said profiles, and said gasket flange [means] having opposite end portions, one end secured to one of said webs and the other end portion secured to the other of said gasket flange, so that the gasket flange means must be fractured in order to gain access into the bag or package.

35. A method according to claim 14, which comprises providing said zipper with opposed webs one of which carries one of the profiles and the other of which carries a complementary profile, and effecting securing of said gasket flange [means] along one edge to one of said webs and along the other edge to the other of said webs, so that in order to gain access into the bag or package the web means must be ruptured.

36. A bag or package according to claim 30, said zipper comprising opposed webs carrying said profiles, and said gasket flange [means] having opposite end portion, one of said end portions being secured to one of said webs and the other end portion being secured to the other of said webs, so that the gasket flange means must be fractured in order to gain access into the bag or package.

37. An elongate reclosable extruded plastic zipper structure for bag or package use:

said zipper structure having opposed webs with complementary profiles separably interlockable in a closed condition of the zipper structure; and gasket flange [means] extending along substantially the full length of the profiles for separably sealingly gripping interengagement by and between said profiles in said closed condition of the zipper structure

*said gasket flange being secured in part to one of the webs and in part to the other of said webs and extending across said profiles, so that to gain access past said profiles when separated and gasket flange means must be ruptured.*

[38. A zipper structure according to claim 37, wherein said gasket flange means is secured in part to one of the webs and in part to the other of said webs and extends across said profiles, so that to gain access part said profiles when separated said gasket flange means must be ruptured.]

39. [Zipper structure according to claim 37, wherein] *An elongate reclosable extruded plastic zipper structure for bag or package use:*

*said zipper structure having opposed webs with complementary profiles separably interlockable in a closed condition of the zipper structure; and*

*gasket flange means extending along substantially the full length of the profiles for separably sealingly gripping interengagement by and between said profiles in said closed condition of the zipper structure;* said gasket flange [means] is an integrally extruded part of one of said webs and has means permanently securing the gasket flange means to the other of said webs.

40. [A zipper structure according to claim 37, wherein] *An elongate reclosable extruded plastic zipper structure for bag or package use:*

*said zipper structure having opposed webs with complementary profiles separably interlockable in a closed condition of the zipper structure; and*

*gasket flange extending along substantially the full length of the profiles for separably sealingly gripping interengagement by and between said profiles in said closed condition of the zipper structure;* said gasket flange means comprises a separately formed member, a portion of the gasket flange member being secured permanently to one of said webs and another portion of the gasket flange member secured permanently to the other of said webs.

41. [Zipper structure according to claim 37, wherein] *An elongate reclosable extruded plastic zipper structure for bag or package use:*

*said zipper structure having opposed webs with complementary profiles separably interlockable in a closed condition of the zipper structure; and*

*gasket flange extending along substantially the full length of the profiles for separably sealingly gripping interengagement by and between said profiles in said closed condition of the zipper structure;* said webs have two sets of spaced complementary profiles with a substantial area of the webs extending intermediate said sets of complementary profiles, and said gasket flange [means] being attached to one of said webs and extending between said profiles of each set and attached to the other of said webs in said area intermediate said sets of profiles.

42. A zipper structure according to claim 37, wherein said gasket flange [means] is attached to one of said webs.

43. A zipper structure according to claim 42, wherein said gasket flange [means] is attached at only one edge to said one web.

44. A zipper structure according to claim 42, wherein said gasket flange [means] extends between said zipper profiles and has opposite edges which are attached to said one web.

45. [A zipper structure according to claim 37, wherein] *An elongate reclosable extruded plastic zipper structure for bag or package use:*

*said zipper structure having opposed webs with complementary profiles separably interlockable in a closed condition of the zipper structure; and*

*gasket flange extending along substantially the full length of the profiles for separably sealingly gripping interengagement by and between said profiles in said closed condition of the zipper structure;* said gasket flange [means] comprises a pair of gasket flange members, one of which is attached at one edge to one of said webs and the other of which is attached at one edge to the other of said webs.

46. A zipper structure according to claim 45, wherein said members extend between said zipper profiles and have opposite edges attached to their respective webs.

* * * * *